(12) United States Patent
Neighbour et al.

(10) Patent No.: US 12,413,596 B2
(45) Date of Patent: Sep. 9, 2025

(54) ENHANCED AUTHENTICATION USING A SECURE DOCUMENT

(71) Applicant: Capital One Services, LLC, McLean, VA (US)

(72) Inventors: Erik Neighbour, Arlington, VA (US); Jason Pribble, McLean, VA (US); Swapnil Patil, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 203 days.

(21) Appl. No.: 18/328,939

(22) Filed: Jun. 5, 2023

(65) Prior Publication Data
US 2024/0406187 A1    Dec. 5, 2024

(51) Int. Cl.
    *H04L 9/40*      (2022.01)
(52) U.S. Cl.
    CPC ............ *H04L 63/107* (2013.01); *H04L 63/08* (2013.01)
(58) Field of Classification Search
None
See application file for complete search history.

(56) References Cited

U.S. PATENT DOCUMENTS

| | | | |
|---|---|---|---|
| 10,095,877 B2 | 10/2018 | Stack et al. | |
| 10,798,545 B2 * | 10/2020 | Canavor | H04W 12/06 |
| 11,663,306 B2 * | 5/2023 | Polychronidis | G06V 30/413 |
| | | | 713/186 |
| 2006/0128397 A1 * | 6/2006 | Choti | G06Q 30/0601 |
| | | | 455/456.1 |
| 2010/0208648 A1 * | 8/2010 | Narkar | H04L 67/52 |
| | | | 455/500 |
| 2016/0132885 A1 * | 5/2016 | Kumar | G06Q 20/4016 |
| | | | 382/137 |
| 2017/0171177 A1 | 6/2017 | Eramian | |
| 2021/0409398 A1 | 12/2021 | Benkreira et al. | |
| 2022/0138298 A1 | 5/2022 | Law et al. | |

OTHER PUBLICATIONS

International Search Report and Written Opinion for Application No. PCT/US2024/028302, mailed on Jul. 12, 2024, 11 pages.

* cited by examiner

*Primary Examiner* — Raqiul A Choudhury
(74) *Attorney, Agent, or Firm* — Harrity & Harrity, LLP

(57) ABSTRACT

In some implementations, a device may obtain, from a user device, a document image that depicts location information associated with an owner of the document. The device may obtain location information associated with the user device. The device may perform optical character recognition using the document image to obtain a location, or may scan a machine-readable code depicted in the document image to obtain the location. The device may determine a device location based on the location information. The device may determine a confidence score based on the location and the device location. The device may determine whether the confidence score satisfies a threshold. The device may perform an action based on determining whether the confidence score satisfies the threshold.

20 Claims, 9 Drawing Sheets

ENHANCED AUTHENTICATION USING A SECURE DOCUMENT

BACKGROUND

An authentication process may be performed for various purposes. For example, if a user attempts to gain access to an account associated with the user, the authentication process may be performed to verify an identity of the user to enable the user to access the account.

SUMMARY

Some implementations described herein relate to a system for location-based authentication using a document and a device location. The system may include one or more memories and one or more processors communicatively coupled to the one or more memories. The one or more processors may be configured to detect an authentication event associated with an access attempt for an account. The one or more processors may be configured to obtain, from a device, a document image based on detecting the authentication event, the document including location information associated with an owner of the document. The one or more processors may be configured to process the document image to obtain an address location based on the location information, wherein processing the image includes at least one of, performing optical character recognition using the document image to obtain the address location, or scanning a machine-readable code depicted in the document image to obtain the address location. The one or more processors may be configured to obtain location information associated with the device, the location information including at least one of, information indicated via metadata associated with the document image, or positioning information indicated by the device. The one or more processors may be configured to determine a confidence score based on the location information and the location information, wherein the confidence score indicates a likelihood that the device is associated with the owner of the document, and wherein the confidence score is based on a correlation between the location information and the location information. The one or more processors may be configured to authenticate the access attempt based on the confidence score satisfying a threshold.

Some implementations described herein relate to a method for location-based authentication using a document and a device location of a user device. The method may include obtaining, by a device, a document image, the document depicting location information associated with an owner of the document. The method may include obtaining, by the device, location information associated with the user device. The method may include processing, by the device, the document image to obtain an address location based on the location information, wherein processing the image includes at least one of, performing, by the device, optical character recognition using the document image to obtain the address location, or scanning, by the device, a machine-readable code depicted in the document image to obtain the address location. The method may include determining, by the device, the device location based on the location information. The method may include determining, by the device, a confidence score based on the address location and the device location. The method may include determining, by the device, whether the confidence score satisfies a threshold. The method may include performing, by the device, an action based on determining whether the confidence score satisfies the threshold.

Some implementations described herein relate to a non-transitory computer-readable medium that stores a set of instructions for a device. The set of instructions, when executed by one or more processors of the device, may cause the device to detect an authentication event associated with an access attempt for an account, the account being associated with a trusted user. The set of instructions, when executed by one or more processors of the device, may cause the device to obtain, from a user device, a document image based on detecting the authentication event, the document being an identification document issued by a trusted entity. The set of instructions, when executed by one or more processors of the device, may cause the device to extract information from the document image, the information including location information associated with an owner of the document. The set of instructions, when executed by one or more processors of the device, may cause the device to extract location information associated with the user device, the location information including at least one of, information indicated via metadata associated with the document image, or positioning information indicated by the user device. The set of instructions, when executed by one or more processors of the device, may cause the device to determine a confidence score based on the location information and the location information, wherein the confidence score indicates a likelihood that the user device is associated with the owner of the document. The set of instructions, when executed by one or more processors of the device, may cause the device to authenticate the access attempt based on the confidence score satisfying a threshold.

DETAILED DESCRIPTION

Figure 1A:
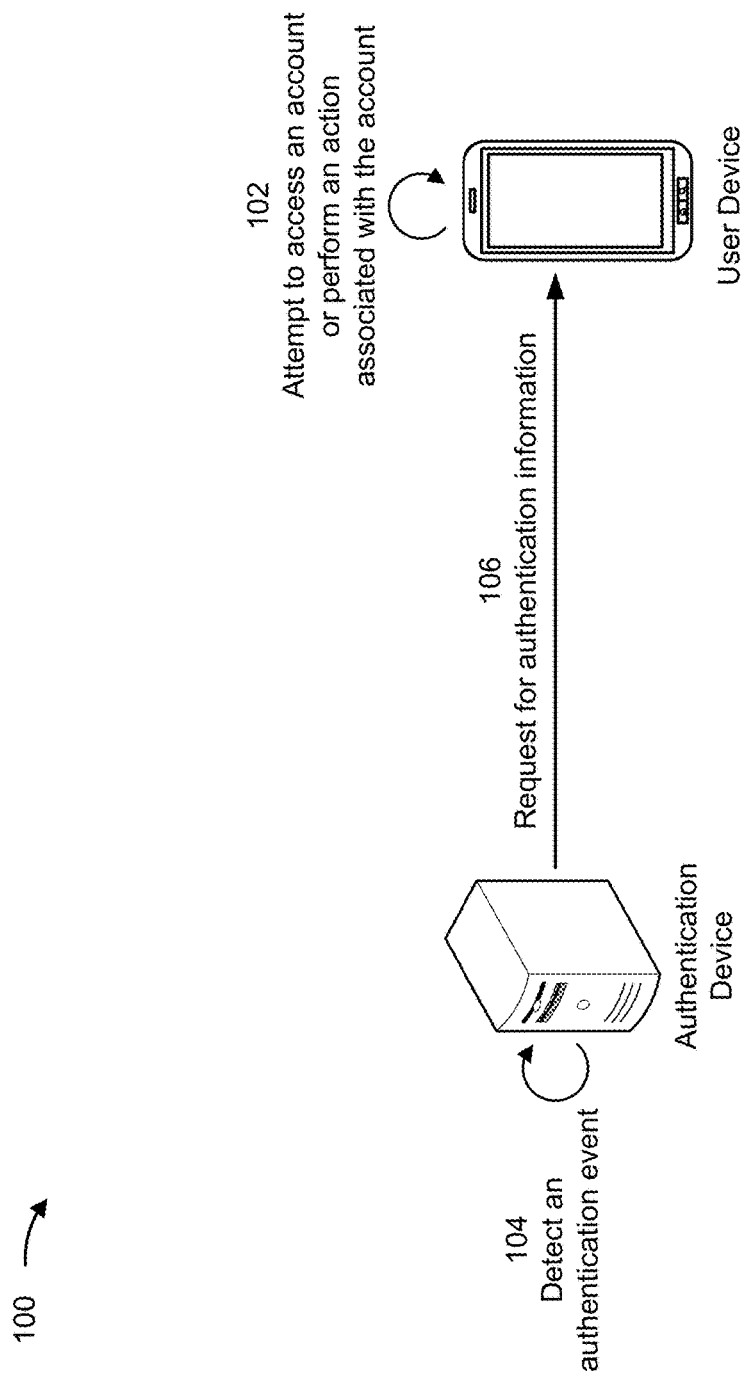
FIGS. 1A-1E are diagrams of an example associated with enhanced authentication using a secure document, in accordance with some embodiments of the present disclosure.

The following detailed description of example implementations refers to the accompanying drawings. The same reference numbers in different drawings may identify the same or similar elements.

Some actions associated with a user may be based on authentication of information associated with the user. For example, a website may use an authentication system to authenticate an identity of the user before granting the user access to the website. As an example, the authentication system may authenticate the identity of the user based on an identification document that is issued to a person, such as a driver's license. For example, multi-factor authentication (MFA) is an authentication technique in which a device of the user is granted access to a resource (e.g., a computing resource, an application, and/or a page associated with an account) only after successfully presenting two or more factors to the authentication system. The two or more factors may include knowledge (e.g., something only the user knows), possession (e.g., something only the user has), and/or inherence (e.g., something only the user is), among other examples.

For example, the authentication system may authenticate an access attempt (e.g., to access a resource) using a document, such as an identification document. In some cases, the user may provide an image of the identification document to the authentication system. The authentication system may analyze the image of the identification document to determine whether to authenticate the identity of the user. For example, the authentication system may authenticate the identity of the user based on determining that the identification document is valid or authenticate. As an example, the authentication system may read a barcode and/or a machine-readable code depicted in the identification document that encodes information that indicates whether the identification is valid or authenticate. The authentication system may decode the information to determine whether the identification document is valid or authentic.

However, in some cases, the authentication system is unable to determine whether the user that provides the image of the identification document is the person to which the identification document is issued. For example, a malicious actor may steal a valid identification document from another person and may provide the valid identification document to the authentication system. Because the identification document is valid (e.g., as indicated by the information encoded in the bar code and/or the machine-readable code), the authentication system may incorrectly authenticate the identity of the user and grant the malicious actor access to a resource.

As a result, the authentication system may consume resources (e.g., computing resources, memory resources, networking resources, and/or other resources) associated with granting the malicious actor access to a resource based on the incorrect authentication determination. For example, the authentication system may consume resources to perform a forensic examination associated with the resource to determine whether the malicious actor caused any adverse effects to the resource. As another example, the authentication system may consume resources to provide notifications associated with the improper access to the resource.

In some cases, the identification document may include an image of a person to which the identification document is issued, and the user may provide a live user image of the user (e.g., an image of a live person rather than an image of an image) to the authentication system. As an example, the authentication system may analyze the image of the person to which the document is issued and the live user image to determine whether to authenticate the identity of the user. In some cases, the authentication system may compare the image of the person to which the document is issued and the live user image to determine whether the user is the person to which the document is issued.

However, in some cases, the authentication system is unable to determine whether the user is the person to which the document is issued. For example, a malicious actor may steal an identification document from another person and may replace an original image of the person to which the document is issued with an image of the user (e.g., a live user image or an image of an image) to create an altered identification document. The user may provide the altered identification document and the live user image to the authentication system. The authentication system may incorrectly authenticate the identity of the user and grant the malicious actor access to the resource. As a result, the authentication system may consume resources associated with granting the malicious actor access to the resource based on the incorrect authentication determination.

Some implementations described herein provide enhanced authentication using a secure document. In some implementations, the secure document (also referred to as a "document" or an "identification document") may be associated with a particular person. The enhanced authentication may be based on image analysis of the document and/or information associated with the document. In some implementations, the document may be an identification document issued to a person, such as a driver's license and/or a passport issued to the person, among other examples. As an example, the document may include an identification image that depicts a face of the person to which the document is issued.

In some implementations, a system may detect an authentication event associated with an access attempt for an account. For example, a user device may attempt to access the account by submitting credentials (e.g., submitted via a user input from a user), such as login credentials, to the system. The system may detect the login attempt as the authentication event. In some implementations, the system may transmit, and the user device may receive, a request for authentication information based on detecting the authentication event (e.g., as part of an MFA procedure associated with the access attempt). The system may obtain, from the user device, an image of the identification document based on the request for authentication information. In some implementations, the system may extract an identification image from the document, and the identification image may be an image of an owner of the document (e.g., the identification image may depict a face of a person that is a holder of the document).

In some implementations, the system may extract appearance information associated with the person to which the identification document is issued. For example, the system may extract the appearance information from text on the document, from a machine-readable code provided on the document, and/or by analyzing the identification image of the owner of the document. In some implementations, the appearance information may include one or more document appearance parameters associated with the owner of the document, such as an age, an eye color, a gender, a skin color, a facial characteristic, a weight, and/or a height, among other examples.

In some implementations, the system may obtain, from the user device, a live user image (e.g., an image that depicts a face of the user, which may be sometimes referred to as a "selfie"). In some implementations, the system may use a machine learning model to analyze the document image, the live user image, and the appearance information to determine a confidence score that indicates a likelihood that the user is associated with the document (e.g., that the user is the person to which the document is issued).

For example, the system may determine whether the user is the person to which the document is issued by comparing the identification image to the live user image (e.g., the selfie) to identify whether the one or more document appearance parameters (e.g., extracted from the machine-readable code and/or from the text on the document) are included in the live user image. In some implementations, the system may perform an action based on determining whether the user is the person to which the document is issued, such as authenticating an access attempt to the account by the user based on determining that the user is the person to which the document is issued. In some implementations, the enhanced authentication may be based on a document that includes location information (e.g., address information or other information indicative of a location or home associated with an owner of the document) associated with an owner of the document and a device location, such as a location associated with the user device of the user.

In some implementations, the system may obtain, from the user device, location information associated with the user device. As an example, the location information may include information indicated via metadata associated with the document image and/or positioning information indicated by the user device. In some implementations, the system may determine a confidence score based on the address information and the location information. As an example, the confidence score may indicate a likelihood that the user device is associated with the owner of the document and the confidence score may be based on a correlation between the location information and the address information. In some implementations, the system may authenticate the access attempt based on the confidence score satisfying a threshold, as described in more detail elsewhere herein.

In this way, implementations described herein provide enhanced authentication techniques using a document and/or a device location, such as by indicating a likelihood that the user is the person to which the document is issued and/or by indicating a likelihood that the device is associated with the owner of the document. Because the system uses enhanced authentication techniques using the secure document, the system can determine when a valid or otherwise authentic identification document is provided by a malicious actor. Thus, the system consumes less resources compared to other authentication techniques (e.g., by avoiding a need to perform actions associated with incorrect authentication determinations, such as forensic examination of data, generating notifications, and/or transmitting notifications associated with a malicious actor).

FIGS. 1A-1E are diagrams of an example 100 associated with enhanced authentication using a secure document. As shown in FIGS. 1A-1E, example 100 includes an authentication device and a user device. These devices are described in more detail in connection with FIGS. 3 and 4.

In some implementations, the authentication device may be associated with an entity, such as an organization, a merchant, and/or a financial institution, that generates, provides, manages, and/or maintains an account (or other resource) associated with a user and/or that performs actions associated with the user. For example, the authentication device may be associated with an entity that generates, provides, manages, and/or maintains a credit card account, a loan account, a capital loan account, a checking account, a savings account, a reward account, a payment account, and/or a user account associated with the user, among other examples. As an example, the authentication device may authenticate an access attempt, performed by the user, to the account based on a confidence score satisfying a threshold and/or the authentication device may perform an action (e.g., authorize and/or enable an action of the user to be performed) based on determining whether the user is the person to which the document is issued, as described in more detail elsewhere herein.

As shown in FIG. 1A, and by reference number 102, the user device may obtain an indication of an access attempt associated with an account. For example, a user may attempt to access an account and/or may perform an action associated with the account. For example, the entity may be a credit card issuer that generates, provides, manages, and/or maintains a credit card account associated with the user, and the user may attempt to access the credit card account by performing a login associated with the credit card account. As an example, the user device may obtain credentials, such as login credentials, via a graphical user interface (GUI) of a website associated with the credit card issuer to perform the login associated with the credit card account.

As another example, the entity may be a merchant that operates an application that is executable on the user device of the user, such as a food delivery service application. For example, the merchant may generate, provide, manage, and/or maintain an account associated with the user. The user device may perform the action associated with the account by obtaining a payment associated with the application account, such as by obtaining credit card information into a GUI of the application associated with the application account. In other words, the attempt to access the account may include a login attempt, a payment attempt, and/or an attempt to access and/or modify information associated with the account (e.g., payment information), among other examples.

As shown by reference number 104, the authentication device may detect an authentication event. In some implementations, the authentication event may be an event that the authentication device detects that triggers the authentication device to perform an authentication protocol, as described in more detail elsewhere herein. For example, the authentication event may be associated with a multi-factor authentication protocol.

In some implementations, the authentication event may be associated with the attempt to access the account performed by the user. As an example, if the authentication device is associated with the credit card issuer and the user attempts to access the credit card account by performing the login associated with the credit card account, then the authentication device may detect the login associated with the credit card account, performed by the user, as the authentication event.

In some implementations, the authentication event may be associated with the action associated with the account performed by the user. As an example, if the authentication device is associated with the merchant that operates the application and the user performs the payment associated with the application account, then the authentication device may detect the payment, performed by the user, as the authentication event. In some implementations, the authentication event may be associated with multifactor authentication. For example, the access attempt to the account performed by the user may indicate valid login credentials, but the user may incorrectly answer a verification question. The authentication device may detect the incorrect answer provided by the user as the authentication event. In this example, the authentication device may request an additional authentication factor from the user, such as the identification document.

As shown by reference number 106, the authentication device may transmit, and the user device may receive, a request for authentication information. For example, the authentication device may transmit, and the user device may receive, the request for the authentication information based on detecting the authentication event associated with the access attempt to the account and/or an action performed in connection with the account. In some implementations, the request for the authentication information may be based on information associated with the document, such as appearance information and/or address information. For example, the request for the authentication information may be a request for a document image to enable the authentication device to authenticate the document as a second authentication factor.

In some implementations, the document may be an identification document issued by a trusted entity (e.g., a government entity), such as a state driver's license, an identification card, a Territories driver's license, a tribal identification card that is signed by an associated bearer, a U.S. Military identification card that is signed by an associated bearer, a passport, a resident alien card, and employment authorization card, and/or a temporary resident card, among other examples. In some implementations, the document may be a check, a contract, a resume, a utility bill, and/or an envelope, among other examples.

Thus, in some implementations, the document may include information associated with the person to which the document is issued, such as appearance information and/or information associated with an image, a current address, a signature, and/or a unique identifier associated with the person to which the document is issued (e.g., the owner of the document), among other examples. In some implementations, the appearance information may be based on information that the user submits when applying for the document and may describe an appearance of the owner of the document. Thus, in some implementations, the appearance information may include one or more document appearance parameters associated with the person to which the document is issued.

As an example, the one or more document appearance parameters may include an age, an eye color, a gender, a skin color, a facial characteristic, a weight, and/or a height, among other examples, associated with the person to which the document is issued. In some implementations, the information associated with the document, such as the appearance information and/or address information, may be encoded in a machine-readable code, such as a barcode, that is provided on the document.

In some implementations, the machine-readable code may encode an image identifier associated with the identification image included in the document. As an example, the image identifier may be associated with a server that stores the identification image included in the document as a color image, such as a high-resolution color image version of the identification image. In some implementations, the image identifier may be used to obtain the high-resolution color version of the identification image, as described in more detail elsewhere herein. In this way, if the identification image provided on the document is of poor quality and/or is a black and white image, then the authentication device may retrieve the high-resolution color version of the image for analysis, as described in more detail elsewhere herein. In this way, using the high-resolution color version of the image for analysis enables the authentication device to obtain more information and/or to obtain the information more accurately.

In some implementations, address information included in the document may be associated with the owner of the document (e.g., the address information may indicate a home address associated with the owner of the document). In some implementations, the authentication device may extract information associated with the appearance information and/or the address information from a document image and may compare the extracted information to information associated with a live user image (e.g., a selfie), as described in more detail elsewhere herein. Thus, in some implementations, the request for the authentication information may include a request for a document image and/or a request for a live user image.

In some implementations, the request for the authentication information may include an indication of a document object model (DOM) for a GUI that is associated with the authentication information. As an example, the DOM for the GUI may include a page, such as a webpage and/or a page associated with an application executing on the user device. In some implementations, the page may include an input option associated with the authentication information, such as an input option associated with capturing the document image and/or the live user image. As another example, the input option may be associated with uploading a file, such as a file that includes the document image, to the GUI via the user device. In some implementations, the authentication device may transmit, and the user device may receive, the request for the authentication information that includes the indication of the DOM for the GUI based on detecting the authentication event.

Figure 1B:
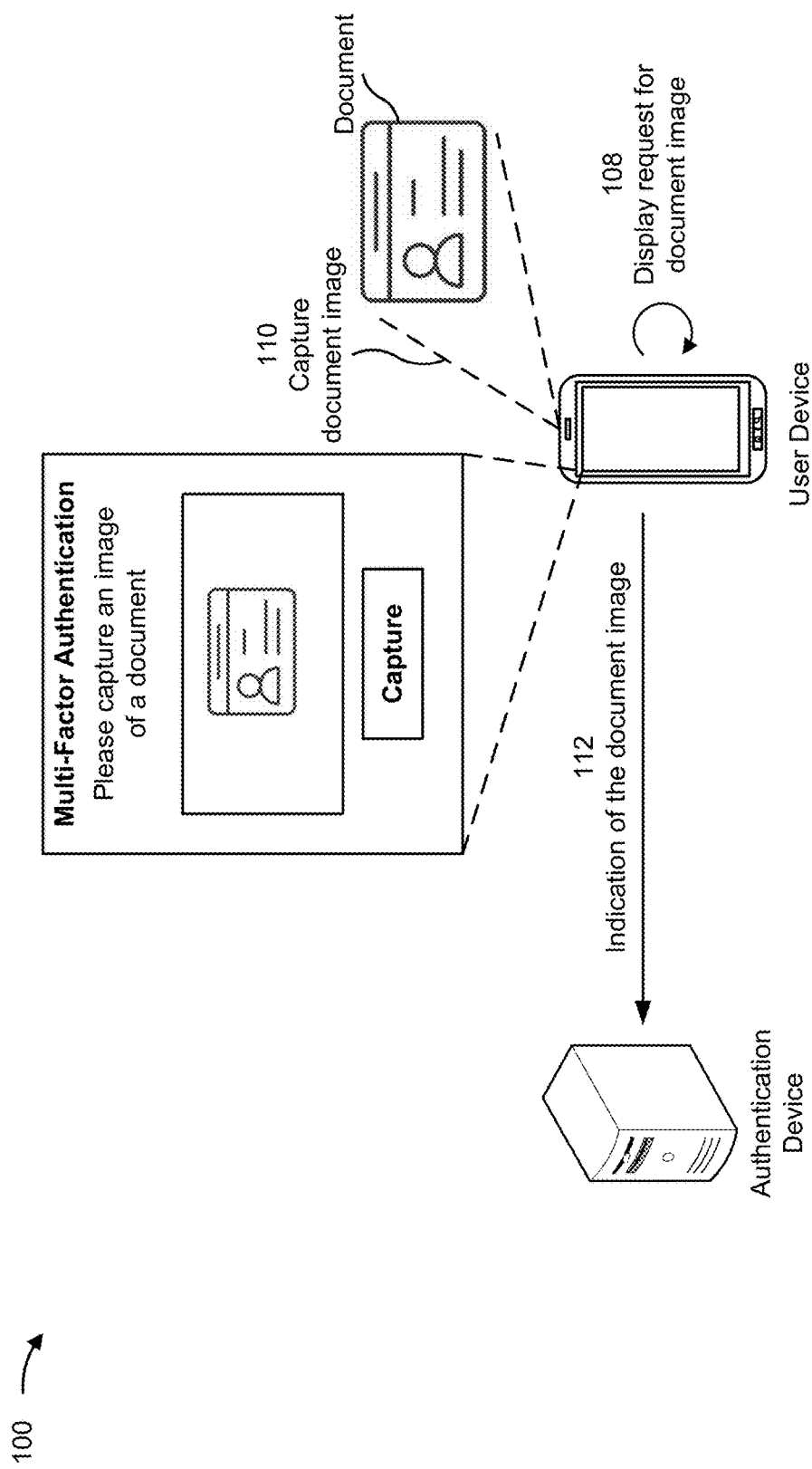

As shown in FIG. 1B, and by reference number 108, the authentication device may cause the user device to display a request for the document image. For example, the user device may display the GUI based on receiving the indication of the DOM for the GUI from the authentication device. In some implementations, the indication of the DOM for the GUI may include code for generating the GUI, and the user device may execute the code to display the GUI, such as in a web browser of the user device and/or in a page of an application executing on the user device. In some implementations, the user device may present the GUI for display to the user of the user device. As shown in FIG. 1B, the GUI may include the input option of a "Capture" button that, when selected by a user, causes the user device to capture an image, as described in more detail elsewhere herein.

As shown by reference number 110, the user device may capture the document image. In some implementations, the user may provide an input to the user device to capture the document image. For example, the user may align a camera of the user device with the document and may press the "Capture" button on the GUI to capture the document image. Additionally, or alternatively, the user may use the user device to select an upload button (not shown) to upload the document image to the GUI.

In some implementations, the user device may generate metadata associated with the document image based on capturing the document image. As an example, the metadata associated with the document image may include geographic location information that corresponds to a location associated with the user device at a time that the document image is captured and/or timestamp information that corresponds to a time that the document image is captured, among other examples.

In some implementations, the geographic location information that corresponds to the location associated with the user device may be based on network connection information associated with the user device, such as wireless Internet connection information and/or mobile data connection information associated with the device, and/or coordinate information, such as latitude and longitude coordinates associated with a geographic location obtained by a global positioning system (GPS) of the user device. As an example, the authentication device may determine one or more locations associated with the user device based on the geographic location information, as described in more detail elsewhere herein.

As shown by reference number 112, the authentication device may obtain, and the user device may transmit, an indication of the document image. For example, the authentication device may obtain the indication of the document image from the user device based on capturing the document image. In some implementations, the user device may transmit, and the authentication device may receive, location information associated with the document image, such as the metadata associated with the document image and/or positioning information indicated by the user device. As an example, the indication of the document image may include the positioning information and the authentication device may obtain the positioning information based on receiving the indication of the document image. In some implementations, the positioning information may indicate geographic identifiers associated with a location, such as a geographical location of the device and/or an identifier associated with the device. As an example, the location may be based on GPS coordinates indicated by the user device. As another example, the identifier associated with the user device may be an internet protocol (IP) address associated with the user device.

Figure 1C:
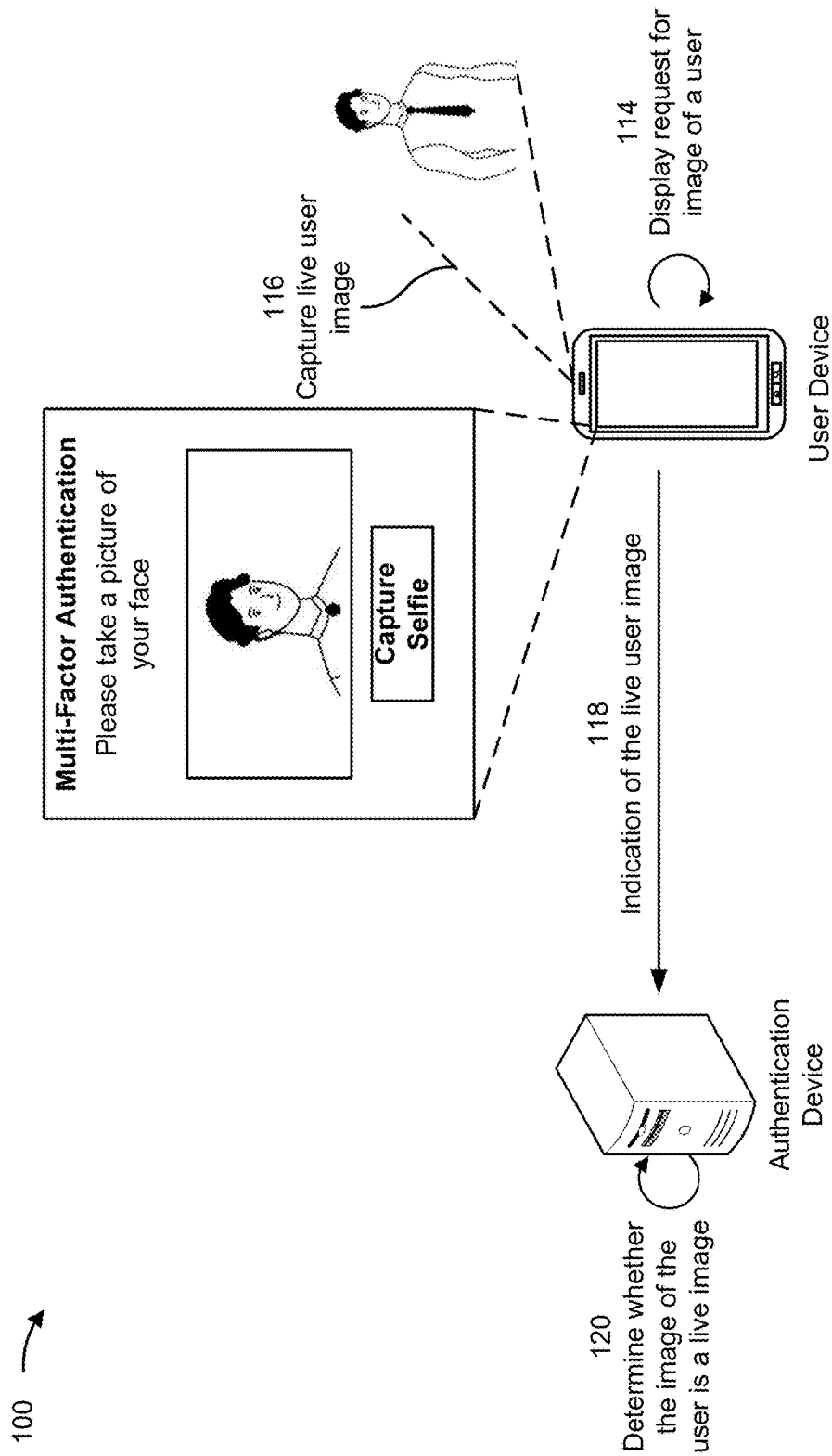

As shown in FIG. 1C, and by reference number 114, the authentication device may cause the user device to display a request for an image of a user. For example, the user device may display the GUI based on receiving the indication of the DOM for the GUI from the authentication device, as described above. As shown in FIG. 1C, the GUI includes the input option of a "Capture Selfie" button that the user presses to capture a live user image that depicts a face of the user, as described in more detail elsewhere herein.

As shown by reference number 116, the user device may capture the live user image. In some implementations, the user may provide an input to the user device to cause the user device to capture a live user image. For example, the user may align the camera of the user device with the face of the user and may press the "Capture Selfie" button on the GUI to capture the live user image that depicts the face of the user.

In some implementations, the user device may generate metadata associated with the live user image based on capturing the live user image. As an example, the metadata associated with the live user image generated by the user device may include geographic location information that corresponds to a location associated with the user device at a time that the live user image is captured and/or timestamp information that corresponds to a time that the live user image is captured.

As shown by reference number 118, the authentication device may obtain, from the user device, an indication of the live user image. For example, the authentication device may obtain the indication of the live user image from the user device based on capturing the image of the live user image.

As shown by reference number 120, the authentication device may determine whether the live user image is a live image (e.g., an image of a live person rather than an image of an image) of the user. In some implementations, the live user image is a live user image if the live user image is captured within a time period, such as a time period associated with a web session, an application session, and/or a capture period, among other examples. As an example, the web session may be a communication session associated with a web browser of the user device and a web server that hosts a website (e.g., a web server associated with the credit card issuer), the application session may be a communication session associated with a page of an application executing on the user device and a web server associated with the application executing on the user device (e.g., a web server associated with the food delivery service application), and/or the capture period may be a time period that includes a start time and an end time.

For example, the start time associated with the capture period may be a time when the user device initially displays the GUI, and the end time may be a subsequent time, such as five minutes after the user device initially displays the GUI. As an example, the authentication device may determine that the live user image is a live user image based on determining that the live user image is captured during the web session, during the application session, and/or at a time within the capture period. In some implementations, the authentication device may determine whether the live user image is an image of another image. For example, the authentication device may process the live user image to determine whether the live user image is of a three-dimensional object (e.g., a person) or of a two-dimensional object (e.g., another image). In this way, the authentication device may determine when the user captures an image of an image rather than capturing the live user image.

In some implementations, the metadata associated with the live user image, generated by the user device, may include information associated with the web session, the application session, and/or the capture period. For example, the metadata associated with the live user image may include a time period associated with the web session, a time period associated with the application session, and/or the start time and the end time of the capture period.

Thus, in some implementations, the authentication device may determine whether live user image is a live user image the image by comparing the time stamp information that corresponds to the time that the live user image is captured to the information associated with the web session, the application session, and/or the capture period indicated by the metadata. For example, the authentication device may determine that the live user image is the live user image based on determining that the time that the live user image is captured is within the time period associated with the web session, the application session, and/or the capture period.

In some implementations, the authentication device may cause the "Capture Selfie" input option to be functional only during a predetermined time period, such as from a time that the user device initially displays the GUI to a subsequent time (e.g., the "Capture Selfie" input option may be function for five minutes after the user device initially displays the GUI). In this example, the authentication device may determine that the live user image is the live user image based on determining that the live user image is captured (e.g., because the Capture Selfie button is functional).

Figure 1D:
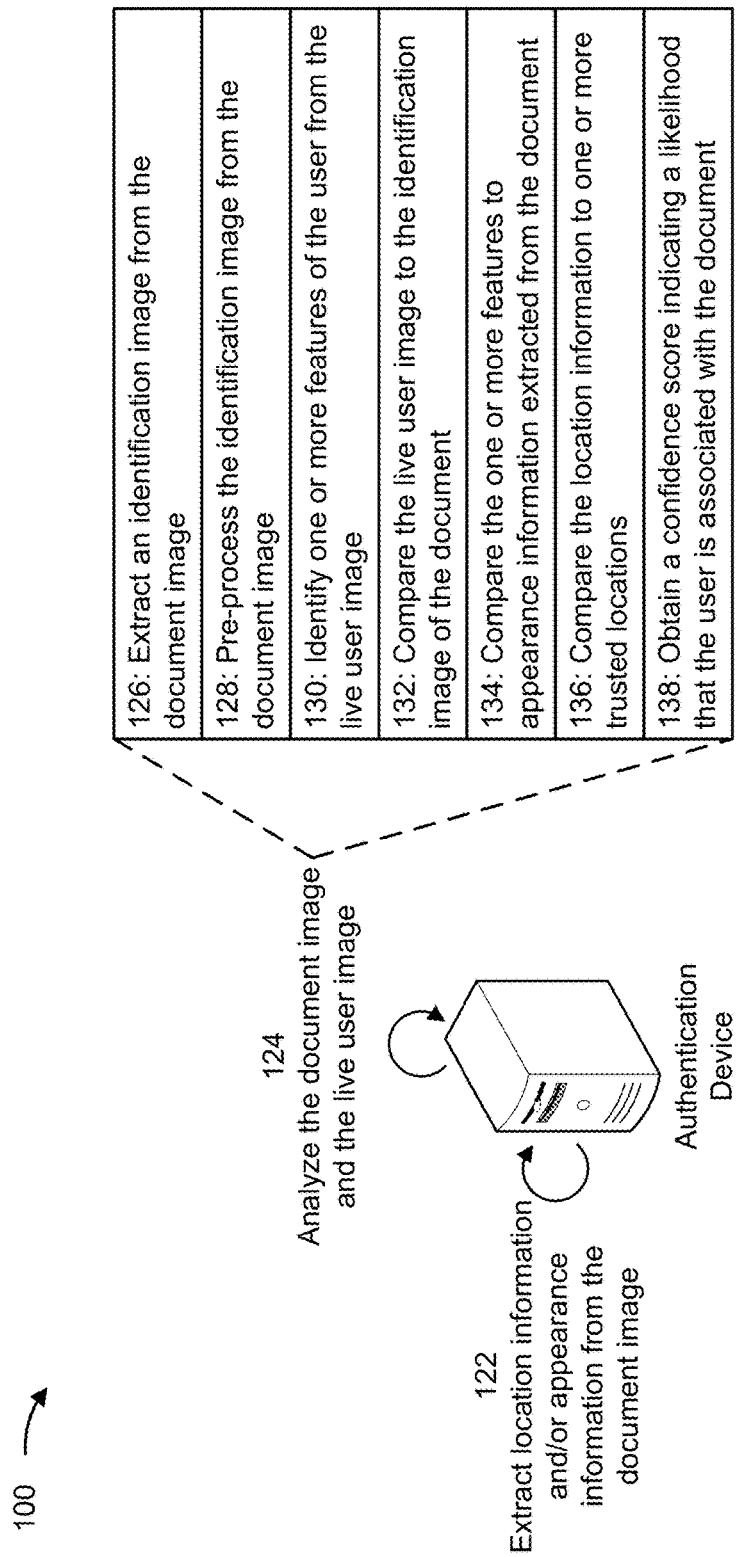

As shown in FIG. 1D, and by reference number 122, the authentication device may extract appearance information and/or address information from the document image. In some implementations, the authentication device may obtain an image of a machine-readable code included in the document image, such as by using a barcode detection technique, and may decode the machine-readable code to obtain the appearance information and/or the address information.

In some implementations, the authentication device may analyze the document image using a computer vision technique, such as an optical character recognition (OCR) technique, to obtain the appearance information and/or the address information. For example, the document image may include text that describes the appearance information and/ or the address information, and the authentication device may use the OCR technique to identify and extract the appearance information and/or the address information.

In some implementations, the authentication device may decode a machine-readable code depicted (e.g., that is in the document image) to obtain the appearance information and/or the address information. As an example, the authentication device may obtain, such as by scanning, an image of a machine-readable code that is included in the document image. The authentication device may decode the machine-readable code to obtain the appearance information and/or the address information.

In some implementations, the authentication device may determine an address location based on the address information. For example, the authentication device may use a text-parsing technique to identify an address associated with the owner of the document based on extracting the address information. In some implementations, the authentication device may perform an address geocoding technique associated with the address to determine geographic coordinates, such as latitude and longitude coordinates, based on the address.

In some implementations, the authentication device may obtain location information associated with the user device based on the information indicated via metadata associated with the image (e.g., described above) and/or the positioning information (e.g., described above) indicated by the user device. In some implementations, the authentication device may extract one or more geographic location identifiers from the information indicated via the metadata associated with the image and/or the positioning information indicated by the user device. For example, the one or more geographic location identifiers may include latitude and longitude coordinates, and the authentication device may determine a device location, such as a geographical position associated with the user device, based on the latitude and longitude coordinates.

In some implementations, the authentication device may determine a location distance that is a distance between the address location and the device location. As an example, if the distance between the address location and the device location is thirty miles, then the authentication device may determine that the location distance is thirty miles. As an example, the authentication device may determine a correlation between the location information and the address information based on the location distance, as described in more detail elsewhere herein.

In some implementations, the authentication device may determine a location region that is associated with the address location. In some implementations, the location region may be a geographical location that is at, or within, a region distance from the address location. For example, if the region distance is thirty miles, then the authentication device may determine that the location region is a geographical location that is at, or within, thirty miles from the address location. As an example, the authentication device may determine a correlation between the location information and the address information based on the location region distance, as described in more detail elsewhere herein.

In some implementations, the authentication device may determine a location region distance that is a distance between the address location and at least a portion of the location region. As an example, if the distance between the address location and the device location is sixty miles, and if the region distance associated with the location region is thirty miles, then the authentication device may determine that the location region distance is thirty miles. In other words, for example, the authentication device may determine a distance between the device location and a portion of a geographical area associated with the address location.

In some implementations, the authentication device may determine one or more historical locations, such as historical locations associated with a transaction associated with the account, the owner of the document, and/or the user device. As an example, a historical location associated with the transaction associated with the account may be a location where the user performed an in-person purchase, such as an in-person purchase of coffee. As another example, a historical location associated with the owner of the document may be a previous home address associated with the owner of the document and/or a historical location associated with the user device may be a location associated with a previously localized geographic location of the user device, such as a previously localized geographic location of the user device based on multilateration of signals (e.g. radio-frequency signals). In some implementations, the authentication device may determine a distance between the one or more historical interactions and the address location and/or a distance between the one or more historical interactions and the device location.

In some implementations, the location information may not include the live user image, but the authentication device may determine and/or confirm the location information using the live user image. As an example, the authentication device may determine the device location based on identifying a geographical location identifier depicted in the live user image. For example, if the geographical location identifier is a landmark located at a geographical position, then the authentication device may determine the device location based on the geographical location of the landmark.

In some implementations, the authentication device may identify one or more location parameters associated with the live user image. As an example, the location parameter may be associated with a time of day and/or a weather condition, such as a daylight parameter (e.g., indicating whether daylight conditions are depicted in the live user image), a nighttime parameter (e.g., indicating whether nighttime conditions are depicted in the live user image), a sunlight parameter (e.g., indicating whether sunlight conditions are depicted in the live user image), a cloud parameter (e.g., indicating whether cloud conditions are depicted in the live user image), and/or a rain parameter (e.g., indicating whether rain conditions are depicted in the live user image), among other examples. In some implementations, the authentication device may use a computer vision technique to identify the location parameter associated with the live user image and may determine whether the location parameter corresponds to the device location. The authentication device may compare the one or more location parameters to conditions associated with the device location near a time at which the live user image is captured to determine whether the live image is valid or authentic. For example, if the location parameter is a rain parameter, the authentication device may determine that the location parameter corresponds to the device location based on determining that a weather condition associated with the device location at the time that the live user image is captured is a rainy weather condition (e.g., based on a weather report associated with the device location at the associated time).

As another example, if the location parameter is a rain parameter, the authentication device may determine that the location parameter does not correspond to the device location by determining that a weather condition associated with the device location that corresponds to the time that the live user image is captured is a sunlight weather condition (e.g., based on the weather report associated with the device location at the associated time). Thus, in some implementations, the authentication case may use the location parameter as a factor for authentication.

For example, the authentication device may authenticate the access attempt to the account and/or perform the action based on determining that the location parameter corresponds to the device location (e.g., a weather condition indicated in the live user image matches a weather condition corresponding to the device location at the time that the live user image is captured). As another example, the authentication device may not authenticate the access attempt to the account and/or perform the action based on determining that the location parameter does not correspond to the device location (e.g., a weather condition indicated in the live user image does not match a weather condition corresponding to the device location at the time that the live user image is captured).

In some implementations, the user device may be a trusted device. For example, the user device may be a trusted device based on the user device being previously authenticated by a multi-factor authentication technique. In some implementations, the authentication device may identify a network identifier associated with the trusted device and the authentication device may determine the device location based on the network identifier. For example, the network identifier may be a network connection (e.g., a Bluetooth connection), and the authentication device may determine the device location based on the network connection.

As shown by reference number 124, the authentication device may analyze the document image and the live user image. For example, the authentication device may process and/or analyze the document image, information associated with the document image, the live user image, and/or information associated with the live user image by using various techniques, such as image analysis techniques and/or machine learning models, as described in more detail elsewhere herein. The authentication device may analyze the document image and the live user image to determine whether to authenticate the access attempt and/or action associated with the account, as described in more detail elsewhere herein.

As shown by reference number 126, the authentication device may extract an identification image from the document image. In some implementations, the identification image included in the document image may depict a face of the person to which the document is issued, and the authentication device may detect the identification image by using a computer vision technique, such as an object recognition technique. As an example, the authentication device may extract the identification image from the document image based on detecting the identification image in the document image via the object recognition technique.

In some implementations, the authentication device may obtain, such as by scanning, an image of a machine-readable code that is included in the document image and may decode the machine-readable code to obtain the image identifier associated with the identification image included in the document (e.g., as described above). For example, the system may perform OCR on the document image to obtain an image of the machine-readable code depicted in the document image.

In some implementations, the authentication device may obtain the high-resolution color version of the identification image based on decoding the machine-readable code. As an example, the authentication device may use the image identifier to retrieve the high-resolution color version from the web server that stores the high-resolution color version of the identification image. As another example, the image identifier may indicate a link, such as a link to a webpage that displays (e.g., via a web browser) the high-resolution color version of the identification image, and the authentication device may follow the link to retrieve the high-resolution color version of the image, such as by downloading the high-resolution color version of the identification image from the website. In this way, using the high-resolution color version of the image for analysis enables the authentication device to obtain more information and/or to obtain the information more accurately.

As shown by reference number 128, the authentication device may pre-process the identification image from the document image (e.g., may perform one or more image pre-processing operations). In some implementations, the authentication device may identify an issue date associated with the document from the document image. As an example, the authentication device may perform a computer vision technique on the document image, such as the OCR technique, to extract text from the document that indicates the issue date. In some implementations, the authentication device may use a machine learning technique, such as keyword-parsing technique, to identify and extract the issue date associated with the document based on extracting the text via the OCR technique.

In some implementations, the authentication device may perform an image manipulation operation, such as an age progression operation, to modify the identification image to a modified identification image based on an amount of time between the issue date and a current date. As an example, the authentication device may use a machine learning model to analyze the identification image and the amount of time between the issue date and the current date to generate the modified identification image.

In some implementations, the modified identification image may be an estimated identification image at the current date. As an example, the estimated identification image at the current date may depict an estimated face of the owner associated with the document at the current date, such as an age progressed face of the owner associated with the document based on the amount of time between the issue date and the current date.

As another example, if the issue date associated with the document is Jan. 1, 2020, and if the current date is Jan. 1, 2023, then the identification image may depict a face of the owner associated with the document as the face appears on Jan. 1, 2020, and the modified identification image may depict an age progressed face of the owner associated with the document based on three years (e.g., the amount of time between the issue date and the current date). In this way, the modified identification image may enable a more accurate analysis when comparing the modified identification image to the live user image relative to comparing the identification image to the live user image.

As shown by reference number 130, the authentication device may identify one or more features of the user from the live user image. In some implementations, the authentication device may identify one or more live user image appearance parameters from the live user image and one or more identification image appearance parameters from the identification image of the document.

In some implementations, the one or more live user image appearance parameters from the live user image may be based on the appearance of the person depicted in the live user image. In some implementations, the one or more identification image appearance parameters from the identification image of the document may be based on the appearance of the person depicted in the identification image from the document.

In some implementations, the one or more live user image appearance parameters from the live user image and/or the one or more identification image appearance parameters from the identification image may include one or more of an age, an eye color, a gender, a skin color, a facial characteristic, a weight, and/or a height associated with the user depicted in the live user image and/or the person depicted in the identification image. Thus, in some implementations, the one or more document appearance parameters, the one or more live user image appearance parameters, and/or the one or more identification image appearance parameters may be associated with one or more of an age, an eye color, a gender, a skin color, a facial characteristic, a weight, and/or a height.

In some implementations, the authentication device may analyze the live user image to estimate one or more live user image values of the one or more live user image appearance parameters. In some implementations, the estimated one or more live user image values may be an estimated age, an estimated eye color, an estimated gender, an estimated skin color, an estimated facial characteristic, an estimated weight, and/or an estimated height associated with the live user image (e.g., the face of the user depicted in the liver user image).

As an example, the authentication device may analyze, using a trained image classification model, the live user image to obtain the one or more live user image values. In some implementations, the authentication device may obtain one or more document values of the one or more document appearance parameters obtained via the document image and/or one or more identification values of the one or more identification image appearance parameters obtained via the identification image.

In some implementations, the authentication device may input the one or more live user image values, and the one or more document values, and/or the one or more identification values to obtain, from the machine learning model, a confidence score indicating a likelihood that the user is the person to which the document is issued, as described in more detail elsewhere herein.

As shown by reference number 132, the authentication device may compare the live user image to the identification image of the document. In some implementations, the authentication device may compare the one or more live user image appearance parameters from the live user image and the one or more identification image appearance parameters from the identification image of the document to the one or more document appearance parameters associated with the document to determine a confidence score that indicates a likelihood that the one or more live user image appearance parameters and/or the one or more identification image appearance parameters include the one or more document appearance parameters. In other words, the authentication device may extract the identification image from the document, obtain the live user image, analyze the identification image and the live user image to extract the one or more live user image appearance parameters and the one or more identification image appearance parameters, and compare the one or more live user image appearance parameters and the one or more identification image appearance parameters to the appearance information described by text provided on the document to determine the confidence score.

As an example, the one or more live user image appearance parameters, the one or more identification image appearance parameters, and the one or more document appearance parameters may include an eye color of blue and a gender of male. The authentication device may compare the one or more live user image appearance parameters and the one or more identification image appearance parameters to the one or more document appearance parameters associated with the document to determine the confidence score that indicates a likelihood that the one or more live user image appearance parameters and the one or more identification image appearance parameters include the one or more document appearance parameters. In this example, the confidence score may be a high confidence score that indicates a strong likelihood that the one or more live user image appearance parameters and the one or more identification image appearance parameters include the one or more document appearance parameters (e.g., the confidence score may satisfy a threshold).

As another example, the one or more live user image appearance parameters may include an eye color of blue and a gender of male, the one or more identification image appearance parameters may include an eye color of brown and a gender of female, and the one or more document appearance parameters may include an eye color of green and a gender of male. The authentication device may compare the one or more live user image appearance parameters and the one or more identification image appearance parameters to the one or more document appearance parameters associated with the document to determine a confidence score that indicates a likelihood that the one or more live user image appearance parameters and the one or more identification image appearance parameters include the one or more document appearance parameters. In this example, the confidence score may be a low confidence score that indicates a weak likelihood that the one or more live user image appearance parameters and the one or more identification image appearance parameters include the one or more document appearance parameters (e.g., the confidence score may not satisfy the threshold).

In some implementations, the authentication device may compare the live user image to the modified identification image (described above) to determine a likelihood that the live user image and the modified identification image are associated with the user. In other words, for example, the authentication device may compare the age progressed face of the user depicted in the modified identification image to the face depicted in the live user image (e.g., the selfie) to determine a likelihood that the live user image and the modified identification image are associated with the user.

As shown by reference number 134, the authentication device may compare the one or more features to appearance information extracted from the document. In some implementations, the authentication device may identify one or more live user image appearance parameters from the live user image and compare the one or more document appearance parameters to the one or more live user image appearance parameters to determine a likelihood that the one or more document appearance parameters are included in the one or more live user image appearance parameters. In other words, the authentication device may obtain the live user image, may analyze the live user image to extract the one or more live user image appearance parameters, and may compare the one or more live user image appearance parameters to the appearance information described by text provided on the document to determine the confidence score, as described in more detail above.

As shown by reference number 136, the authentication device may compare the location information to one or more trusted locations. In some implementations, the authentication device may compare the device location to one or more trusted locations associated with the user device and/or one or more trusted locations associated with the user. For example, the one or more trusted locations may include a recognized location, such as a historical location associated with the user device and/or a historical location associated with the user.

For example, the authentication device may determine that the device location is a trusted location based on determining that the device location is a same location as a trusted location of the one or more trusted locations associated with the user device and/or the user. As another example, the authentication device may determine that the device location is not a trusted location based on determining that the device location is not a same location as a trusted location of the one or more trusted locations associated with the user device and/or the user.

As shown by reference number 138, the authentication device may obtain a confidence score indicating a likelihood that the user is associated with the document. In some implementations, the authentication device may analyze the document image, the live user image, and/or the appearance information to determine a confidence score that indicates a likelihood that the user is associated with the document.

For example, the authentication device may analyze, using a machine learning model, the document image, the live user image, and/or the appearance information to determine a confidence score that indicates a likelihood that the user is associated with the document. As an example, the authentication device may use the machine learning model to determine whether the live user image depicts the one or more document appearance parameters, as described in more detail elsewhere herein.

In some implementations, the confidence score may indicate a likelihood that the one or more live user image appearance parameters from the live user image and the one or more identification image appearance parameters from the identification image of the document include the one or more document appearance parameters. In some implementations, the confidence score may include a first confidence score that indicates a likelihood that the live user image includes the one or more document appearance parameters, and a second confidence score that indicates a likelihood that the live user image matches the identification image from the document.

In some implementations, the live user image may match the identification image based on satisfying a threshold number of matching minutiae points between the live user image and the identification image, such as one or more live user image appearance parameters and/or the one or more identification image appearance parameters. As an example, the live user image may match the identification image based on a number of matching minutiae points being greater than a threshold number of matching minutiae points.

In some implementations, the authentication device may obtain, from an image classification model, one or more estimated live user image appearance parameters and respective likelihood scores based on the live user image. In some implementations, the authentication device may determine the confidence score based on the one or more document appearance parameters, the one or more estimated live user image appearance parameters, and the respective likelihood scores. In other words, the authentication device may obtain, from the output of the image classification model, the estimated one or more liver user image appearance parameters and respective confidence scores associated with the estimated one or more liver user image appearance parameters. The authentication device may compare the estimated one or more liver user image appearance parameters and/or the respective confidence scores associated with the estimated one or more liver user image appearance parameters to the appearance information associated with the document to determine the confidence score that the user (e.g., depicted in the selfie image) is the owner of the document.

In some implementations, the authentication device may determine a confidence score, based on the address information and the location information, that indicates a likelihood that the device is associated with the owner of the document. In some implementations, the confidence score may be based on a correlation between the location information and the address information. In some implementations, the authentication device may determine that the correlation between the location information and the address information is a positive correlation, a negative correlation, a strong positive correlation, and/or a weak negative correlation, among other examples.

For example, the authentication device may determine that the correlation between the location information and the address information is a strong negative correlation based on determining that the location information and the address information have a negligible effect on the confidence score. As another example, the authentication device may determine that the correlation between the location information and the address information is a strong positive correlation based on determining that the location information and the address information have a significant effect on the confidence score.

Thus, in some implementations, the authentication device may determine whether to authenticate the access attempt to the account and/or to perform the action based on the correlation between the location information and the address information. In this way, the authentication device may use the correlation data between the location information and the address information to determine a risk level associated with the access attempt to the account and/or a risk level associated with performing the action.

In some implementations, the authentication device may determine the confidence score based on the address location, the device location, the location distance and/or the location region distance (e.g., as described above). In some implementations, the authentication device may determine one or more historical locations associated with one or more transactions associated with the account, the owner of the document, and/or the device. In some implementations, the authentication device may determine the confidence score based on determining that the device location does not correspond to the trusted location. In some implementations, the authentication device may determine the confidence score based on two or more of the address location, the device location, or the one or more historical locations.

In some implementations, the authentication device may determine the device location based on the geographic identifiers and may determine the confidence score based on the address location and the device location. In some implementations, the authentication device may identify a location parameter associated with the identification image, such as, and may determine whether the location parameter corresponds to the device location. In some implementations, the authentication device may update the confidence score based on determining that the parameter does not correspond to the device location.

Figure 1E:
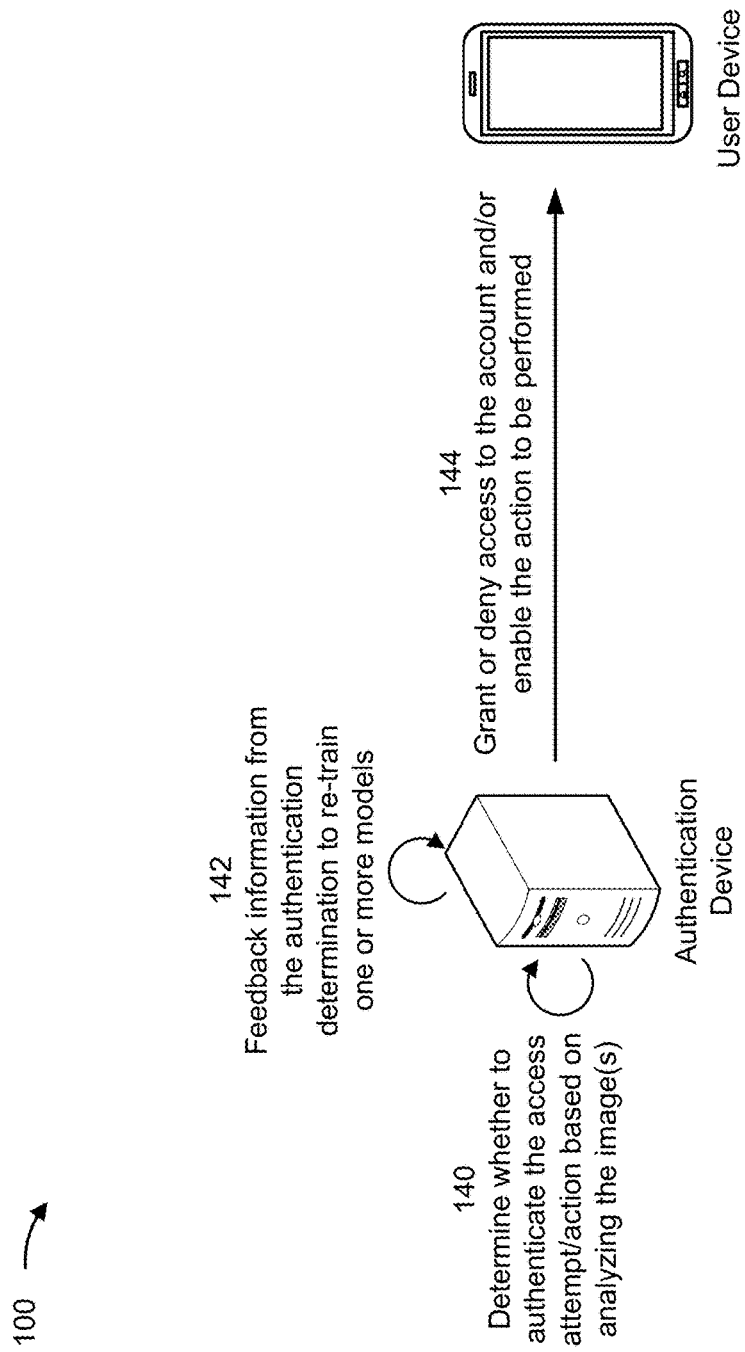

As shown in FIG. 1E, and by reference number 140, the authentication device may determine whether to authenticate the access attempt and/or the action based on analyzing the images. In some implementations, the authentication device may determine whether the confidence score satisfies a threshold. In some implementations, the threshold may include a first threshold and a second threshold. As an example, if the confidence score is greater than a first threshold, then the authentication device may determine that confidence score satisfies the first threshold. As another example, if the confidence score is less than the first threshold and greater than the second threshold, then the authentication device may determine that the confidence score does not satisfy the first threshold and does satisfy the second threshold. In some implementations, the authentication device may determine whether to authenticate the access attempt to the account and/or perform the action based on the confidence score satisfying the threshold (e.g., the first threshold or the second threshold).

In some implementations, the authentication device may determine whether the confidence score satisfies the threshold as one factor (e.g., of multiple factors) in determining whether to authenticate the access attempt to the account and/or perform the action. As an example, the authentication device may determine that the confidence score satisfies the threshold and may input this information into a machine learning model for further authentication analysis, as described in more detail elsewhere herein. For example, if the authentication device determines that the user is not in a location indicated by the document, the document may still be authenticated. In this example, the authentication device may request additional authentication information based on determining that the user is not in the location indicated by the document rather than not authenticating the access attempt to the account and/or not performing the action.

As shown by reference number 142, the authentication device may obtain feedback information from the authentication determination to re-train one or more models. In some implementations, the authentication device may provide feedback, to an age prediction model, that indicates the identification image, the modified identification image, the live user image, the issue date, the current date, and/or an indication that the identification image and live user image are associated with a same user. In some implementations, the age prediction model may be associated with predicting an age of users depicted in images. In some implementations, the authentication device may provide the feedback based on determining that the live user image and the modified identification image are associated with the user. Thus, in some implementations, providing the feedback, such as live user images that have been authenticated and/or live user images that have not been, to the machine learning model may improve the machine learning model. For example, providing the feedback to the machine learning model may improve the accuracy of the machine learning model and/or may improve feature selection associated with the machine learning model.

As shown by reference number 144, the authentication device may grant or deny access to the account and/or enable the action to be performed. In some implementations, the authentication device may grant or deny access to the account and/or may enable the action to be performed based on the confidence score satisfying a threshold. As an example, the authentication device may authenticate the access attempt based on the confidence score satisfying a threshold. As another example, the authentication device may refrain from authenticating the access attempt to the account based and/or refrain from performing the action based on determining that the confidence score does not satisfy the threshold.

In some implementations, the authentication device may perform an action based on determining whether the user is the person to which the document is issued. For example, if the person is an authenticated user, the authentication device may authenticate an access attempt to the account by the user based on determining that the user is the person to which the document is issued. In some implementations, the authentication device may perform the action based on determining whether the confidence score satisfies the threshold. As an example, the authentication device may authenticate the access attempt to the account based on determining that the confidence score satisfies the threshold. As another example, the authentication device may perform an additional authentication operation based on determining that the confidence score does not satisfy the threshold, such as requesting an additional document (e.g., if the document image originally provided to the authentication device indicates that the document is expired).

As another example, if the confidence score satisfies the first threshold, then the authentication device may grant access and/or enable the action to be performed. If the confidence score satisfies the second threshold but does not satisfy the first threshold, then the authentication device may request additional information from the user to determine whether to grant or deny access and/or enable the action to be performed. For example, the authentication device may request additional authentication information from the user, such as biometric information associated with the user, a password, passcode, an answer to a verification question, and/or an authentication token. If the confidence score does not satisfy the second threshold, then the authentication device may deny access, may refrain from enabling the action to be performed, and/or may perform a higher level of authentication operations. For example, the authentication device may request an additional live user image (e.g., if the live user image provided by the user is blurry).

In some implementations, the authentication device may use a multi-factor approach to determine whether to authenticate the access attempt to the account and/or perform the action (e.g., the authentication device may use one or more factors and/or one or more machine learning models). As an example, the authentication device may use a document authentication model to obtain an output that indicates a likelihood that the document is authentic and is associated with a trusted user of the account. The authentication device may provide the document as an input to the document authentication model and the document authentication model may output a document score that indicates the likelihood that the document is authentic and that the document is associated with the trusted user of the account.

In some implementations, the authentication device may use an authentication model to determine whether the access attempt is authentic based on the document score and/or a confidence score. As an example, the authentication device may determine the confidence score associated with an access attempt to the account, may determine the document score, and may provide the confidence score and the document score as an input to an authentication model. The authentication model may generate an output that indicates whether the access attempt is authentic. The authentication device may authenticate the access attempt based on an output of the authentication model indicating that the access attempt is authentic. In some implementations, the authentication device may store the live user image based on the confidence score satisfying the threshold and authenticate one or more future access attempts for the account using the live user image. In this way, because the live user image is a more recent image relative to the identification image, the live user image may provide a more accurate comparison point for the future authentication.

In some implementations, the authentication device may store a device location indicated by the location information based on the confidence score satisfying the threshold and may authenticate one or more future access attempts for the account using the device location. In this way, the device location may be stored as a trusted device location, and may streamline future access attempts based on the trusted device location.

In some implementations, the authentication device may obtain, from the authentication model, one or more estimated device location regions and respective confidence scores based on a device location indicated by the location information. In some implementations, the authentication device may determine the confidence score based on the address information, the location information, and the estimated device location regions and the respective confidence scores.

In this way, some implementations described herein provide enhanced authentication techniques using a document and/or a device location, such as by indicating a likelihood that the user is the person to which the document is issued and/or by indicating a likelihood that the device is associated with the owner of the document. Because the system uses enhanced authentication techniques using the document, the system consumes less resources compared to other authentication techniques (e.g., by avoiding a need to perform actions associated with associated with incorrect authentication determinations, such as forensic examination of data, generating notifications, and/or transmitting the notifications).

As indicated above, FIGS. 1A-1E are provided as an example. Other examples may differ from what is described with regard to FIGS. 1A-1E.

Figure 2:
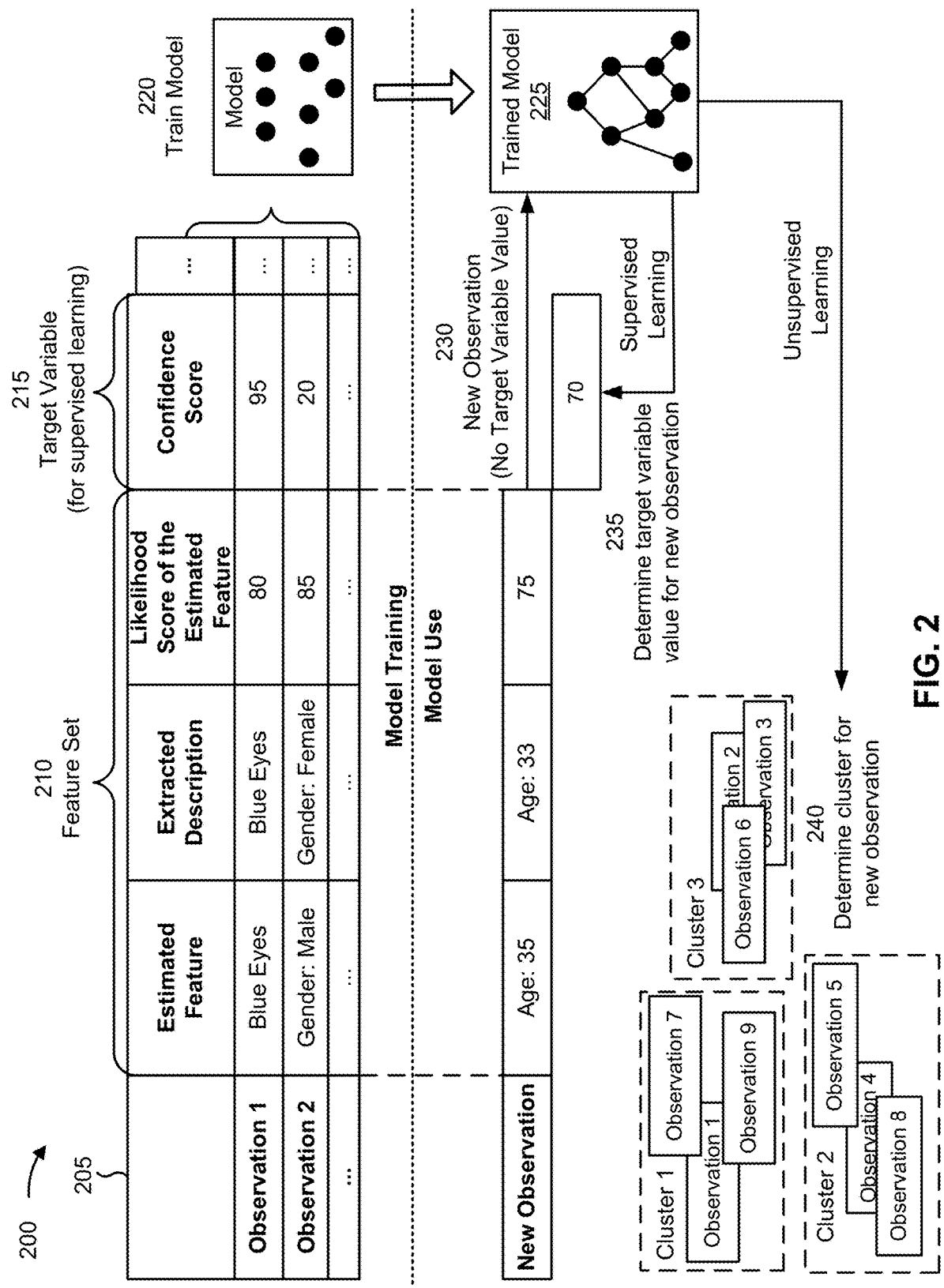
FIG. 2 is a diagram illustrating an example of training and using a machine learning model in connection with enhanced authentication using a secure document, in accordance with some embodiments of the present disclosure.

FIG. 2 is a diagram illustrating an example 200 of training and using a machine learning model in connection with enhanced authentication using a secure document. The machine learning model training and usage described herein may be performed using a machine learning system. The machine learning system may include or may be included in a computing device, a server, a cloud computing environment, or the like, such as the authentication device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the authentication device, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the authentication device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of estimated feature, a second feature of extracted description, a third feature of likelihood score of the estimated feature, and so on. As shown, for a first observation, the first feature may have a value of blue eyes, the second feature may have a value of blue eyes, the third feature may have a value of 80, and so on. These features and feature values are provided as examples, and may differ in other examples. For example, the feature set may include one or more of the following features: appearance parameters, such as an age, an eye color, a gender, a skin color, a facial characteristic, a weight, and/or a height, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is confidence score, which has a value of 95 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on historical data associated with one or more appearance parameters, such as one or more appearance parameters associated with an image that depicts a face of a person.

As shown by reference number 230, the machine learning system may apply the trained machine learning model 225 to a new observation, such as by receiving a new observation and inputting the new observation to the trained machine learning model 225. As shown, the new observation may include a first feature of estimated feature, a second feature of extracted description, a third feature of likelihood score of the estimated feature, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 70 for the target variable of confidence score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation that the authentication device authenticates the access attempt and/or a recommendation that the authentication device performs the action. The first automated action may include, for example, causing the authentication device to authenticate the access attempt and/or causing the authentication device to perform the action.

As another example, if the machine learning system were to predict a value of 20 for the target variable of confidence score, then the machine learning system may provide a second (e.g., different) recommendation (e.g., recommendation that the authentication device does not authenticate the access attempt and/or a recommendation that the authentication device does not perform the action) and/or may perform or cause performance of a second (e.g., different) automated action (e.g., causing the authentication device to generate an alert).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., definitely authenticate), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., maybe authenticate), then the machine learning system may provide a second (e.g., different) recommendation (e.g., a recommendation that the authentication device requests additional authentication information from the user) and/or may perform or cause performance of a second (e.g., different) automated action, such as causing the authentication device to request additional authentication information from the user.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above. In some implementations, the machine learning model may be based on an age prediction model. For example, the age prediction model may predict an age of users depicted in images, and the feature set may include one or more features associated with the identification image, the modified identification image, the live user image, the issue date, the current date. As an example, the age prediction model may output an indication that the identification image and the live user image are associated with a same user.

In some implementations, the machine learning model may be based on the identification image and/or the live user image. For example, the machine learning model may compare the identification image to the live user image, and the feature set may include one or more features associated with the identification image and/or the live user image, such as the one or more document appearance parameters.

In some implementations, the machine learning model may be based on the location information and/or the address information. For example, the machine learning model may determine a correlation between the location information and the address information relative to the confidence score, and the features set may include one or more features associated with the location information and/or the address information, such as the location distance and/or the regions distance. In this example, the machine learning model may determine the confidence score based on the correlation between the location information and the address information.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include the identification image, the live user image, and/or an indication that the identification image and the live user image are associated with a same user. As an example, providing the feedback, such as live user images that have been authenticated and/or live user images that have not been, to the machine learning model may improve the machine learning model. For example, providing the feedback to the machine learning model may improve the accuracy of the machine learning model and/or may improve feature selection associated with the machine learning model.

In this way, the machine learning system may apply a rigorous and automated process to enhanced authentication using a secure document. The machine learning system may enable recognition and/or identification of tens, hundreds, thousands, or millions of features and/or feature values for tens, hundreds, thousands, or millions of observations, thereby increasing accuracy and consistency and reducing delay associated with enhanced authentication using a secure document relative to requiring computing resources to be allocated for tens, hundreds, or thousands of operators to manually authenticate access attempts and/or perform actions using the features or feature values.

As indicated above, FIG. 2 is provided as an example. Other examples may differ from what is described in connection with FIG. 2.

Figure 3:
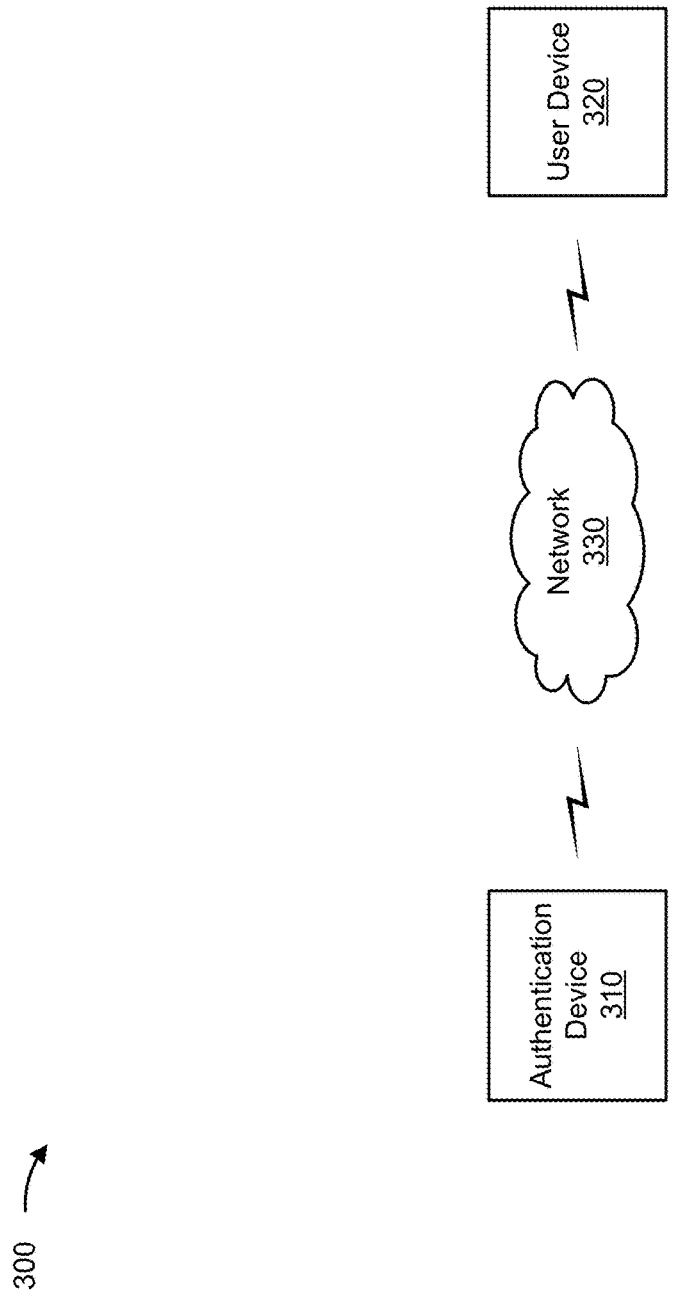
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an authentication device 310, a user device 320, and/or a network 330. Devices of environment 300 may interconnect via wired connections, wireless connections, or a combination of wired and wireless connections.

The authentication device 310 may include one or more devices capable of receiving, generating, storing, processing, providing, and/or routing information associated with enhanced authentication using a secure document, as described elsewhere herein. The authentication device 310 may include a communication device and/or a computing device. For example, the authentication device 310 may include a server, such as an application server, a client server, a web server, a database server, a host server, a proxy server, a virtual server (e.g., executing on computing hardware), or a server in a cloud computing system. In some implementations, the authentication device 310 may include computing hardware used in a cloud computing environment.

The user device 320 may include one or more devices capable of receiving, generating, storing, processing, and/or providing information associated with enhanced authentication using a secure document, as described elsewhere herein. The user device 320 may include a communication device and/or a computing device. For example, the user device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 330 may include one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
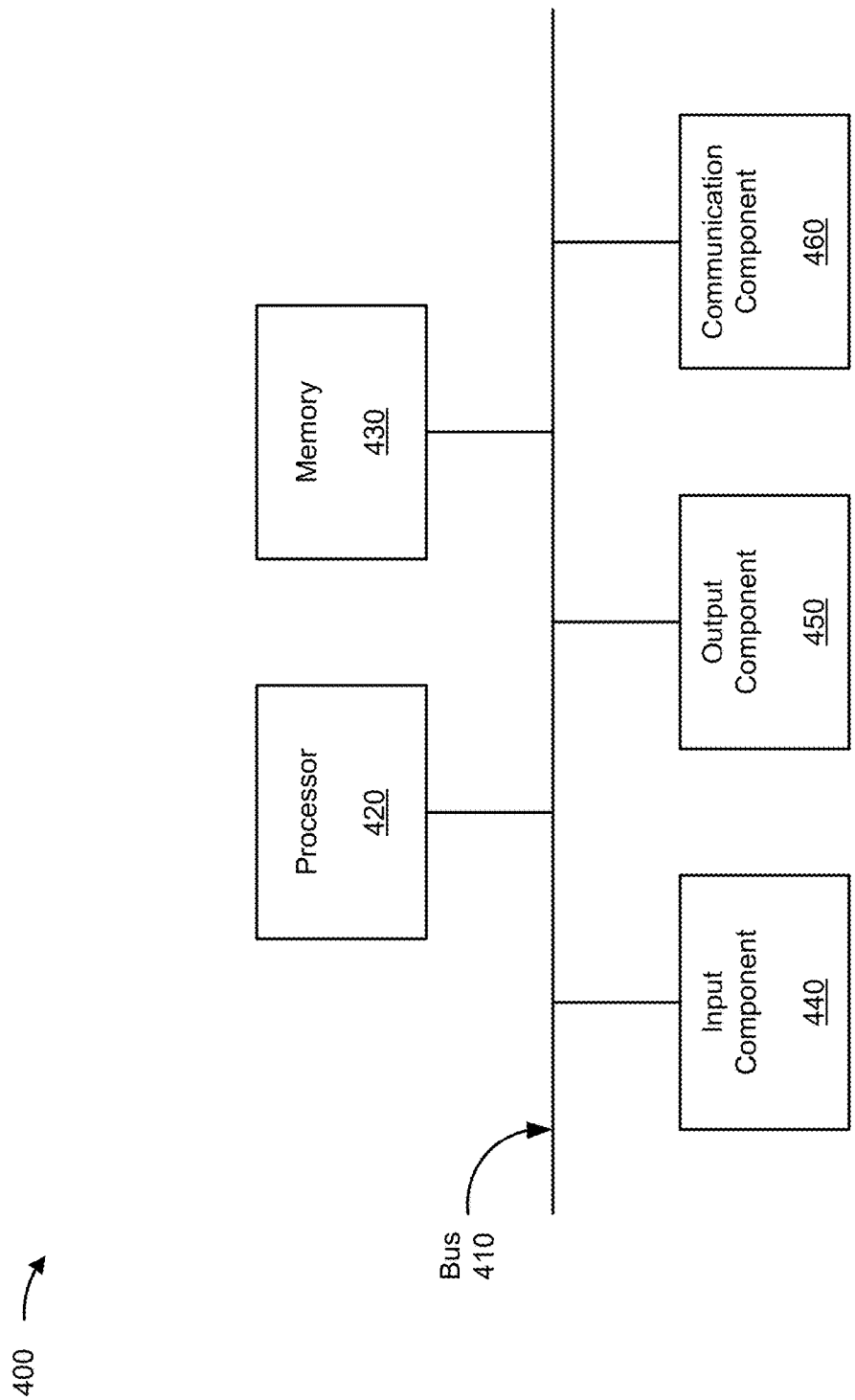
FIG. 4 is a diagram of example components of a device associated with enhanced authentication using a secure document, in accordance with some embodiments of the present disclosure.

FIG. 4 is a diagram of example components of a device 400 associated with enhanced authentication using a secure document. The device 400 may correspond to the authentication device 310 and/or the user device 320. In some implementations, the authentication device 310 and/or the user device 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
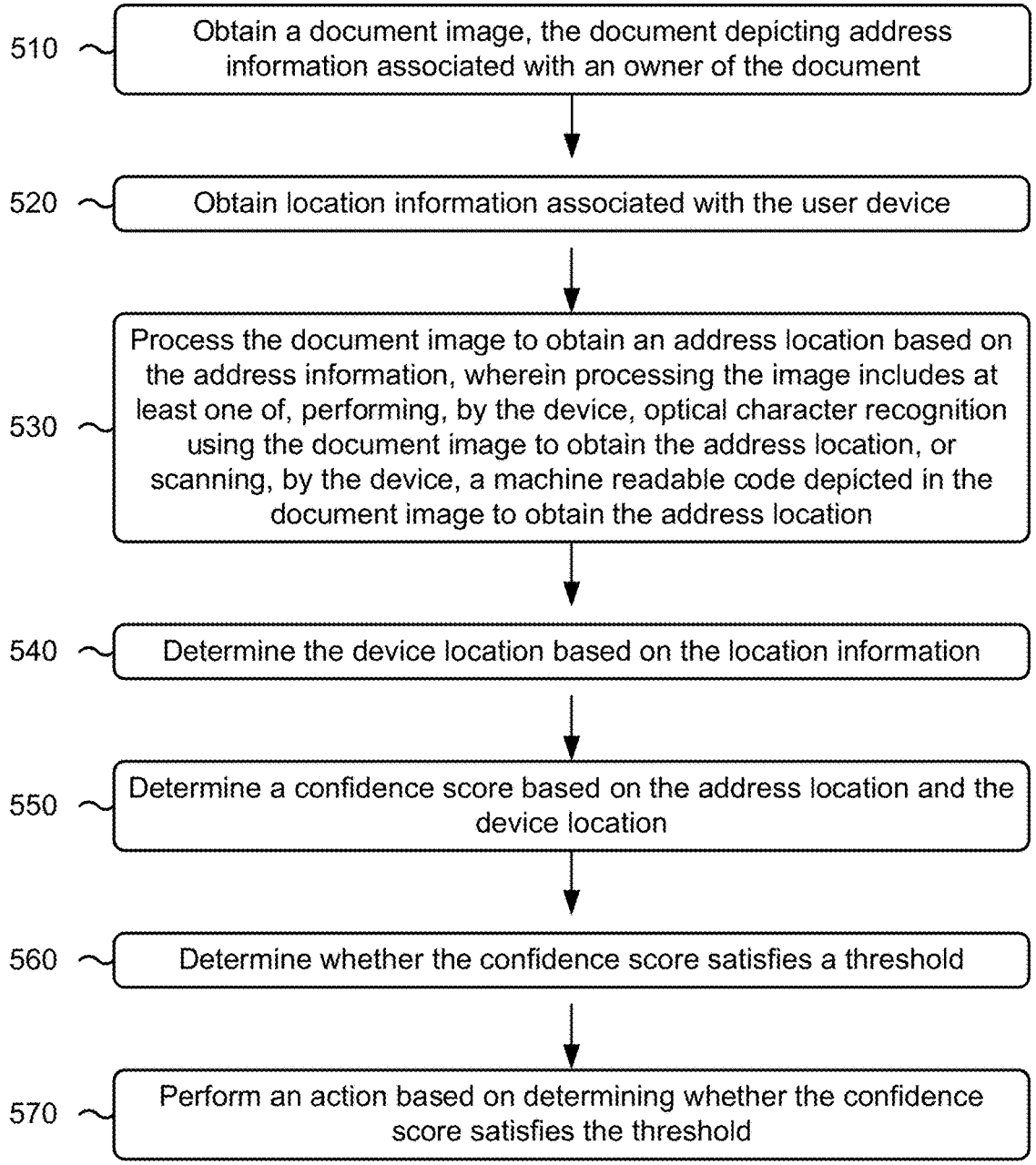
FIG. 5 is a flowchart of an example process associated with enhanced authentication using a secure document, in accordance with some embodiments of the present disclosure.

FIG. 5 is a flowchart of an example process 500 associated with enhanced authentication using a secure document. In some implementations, one or more process blocks of FIG. 5 may be performed by the authentication device 310. In some implementations, one or more process blocks of FIG. 5 may be performed by another device or a group of devices separate from or including the authentication device 310, such as the user device 320. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining a document image, the document depicting address information associated with an owner of the document (block 510). For example, the authentication device 310 (e.g., using processor 420 and/or memory 430) may obtain a document image, the document depicting address information associated with an owner of the document, as described above in connection with reference number 112 of FIG. 1B. As an example, the authentication device may obtain, and the user device may transmit, an indication of the document image. For example, the authentication device may obtain the indication of the document image from the user device based on capturing the document image.

As further shown in FIG. 5, process 500 may include obtaining location information associated with the user device (block 520). For example, the authentication device 310 (e.g., using processor 420 and/or memory 430) may obtain location information associated with the user device, as described above in connection with reference number 112 of FIG. 1B. As an example, the user device may transmit, and the authentication device may receive, location information associated with the document image, such as the metadata associated with the document image and/or positioning information indicated by the user device.

As further shown in FIG. 5, process 500 may include processing the document image to obtain an address location based on the address information, wherein processing the image includes at least one of: performing, by the device, optical character recognition using the document image to obtain the address location, or scanning, by the device, a machine-readable code depicted in the document image to obtain the address location (block 530). For example, the authentication device 310 (e.g., using processor 420 and/or memory 430) may process the document image to obtain an address location based on the address information, wherein processing the image includes at least one of: performing, by the device, optical character recognition using the document image to obtain the address location, or scanning, by the device, a machine-readable code depicted in the document image to obtain the address location, as described above in connection with reference number 122 of FIG. 1D. As an example, the authentication device may analyze the document image using a computer vision technique, such as an optical character recognition (OCR) technique, to obtain the appearance information and/or the address information.

As further shown in FIG. 5, process 500 may include determining the device location based on the location information (block 540). For example, the authentication device 310 (e.g., using processor 420 and/or memory 430) may determine the device location based on the location information, as described above in connection with reference number 122 of FIG. 1D. As an example, the authentication device may extract one or more geographic location identifiers from the information indicated via the metadata associated with the image and/or the positioning information indicated by the user device. For example, the one or more geographic location identifiers may include latitude and longitude coordinates, and the authentication device may determine a device location, such as a geographical position associated with the user device, based on the latitude and longitude coordinates.

As further shown in FIG. 5, process 500 may include determining a confidence score based on the address location and the device location (block 550). For example, the authentication device 310 (e.g., using processor 420 and/or memory 430) may determine a confidence score based on the address location and the device location, as described above in connection with reference number reference number 138 of FIG. 1D. As an example, the authentication device may determine a location distance that is a distance between the address location and the device location and determine the confidence score based on the location distance. In some implementations, the authentication device may determine a correlation between the location information and the address information based on the location distance, as described in more detail elsewhere herein.

As further shown in FIG. 5, process 500 may include determining whether the confidence score satisfies a threshold (block 560). For example, the authentication device 310 (e.g., using processor 420 and/or memory 430) may determine whether the confidence score satisfies a threshold, as described above in connection with reference number 140 of FIG. 1E. As an example, the authentication device may determine that the confidence score satisfies the threshold.

As further shown in FIG. 5, process 500 may include performing an action based on determining whether the confidence score satisfies the threshold (block 570). For example, the authentication device 310 (e.g., using processor 420 and/or memory 430) may perform an action based on determining whether the confidence score satisfies the threshold, as described above in connection with reference number reference number 144 of FIG. 1E. As an example, the authentication device may authenticate the account and/or may enable the action to be performed based on the confidence score satisfying a threshold.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for location-based authentication using a document and a device location, the system comprising:
   one or more memories; and
   one or more processors, communicatively coupled to the one or more memories, configured to:
   detect an authentication event associated with an access attempt for an account;
   obtain, from a device, a document image based on detecting the authentication event, the document including location information associated with an owner of the document;
   process the document image to obtain a location based on the location information associated with the owner of the document, wherein processing the document image includes at least one of:
   performing optical character recognition using the document image to obtain the location, or
   scanning a machine-readable code depicted in the document image to obtain the location;
   obtain location information associated with the device, the location information associated with the device including at least one of:
   information indicated via metadata associated with the document image, or
   positioning information indicated by the device;
   determine a confidence score based on the location information associated with the owner of the document and the location information associated with the device,
   wherein the confidence score indicates a likelihood that the device is associated with the owner of the document, and
   wherein the confidence score is based on a correlation between the location information associated with the owner of the document and the location information associated with the device; and
   authenticate the access attempt based on the confidence score satisfying a threshold.

2. The system of claim 1, wherein the one or more processors, to determine the confidence score, are configured to:
   determine the device location based on at least one of:
   the information indicated via the metadata associated with the document image, or
   the positioning information indicated by the device; and
   determine a location distance that is a distance between the location and the device location; and
   determine the confidence score based on the location distance.

3. The system of claim 1, wherein the one or more processors, to determine the confidence score, are configured to:

determine a location region that is associated with the location;

determine a location region distance that is a distance between the location region and the device location; and determine the confidence score based on the location region distance.

4. The system of claim 1, wherein the one or more processors, to determine the confidence score, are further configured to:

extract a geographic location identifier from at least one of:

the information indicated via metadata associated with the document image, or the positioning information indicated by the device; and determine the device location based on the geographic location identifier; and determine the confidence score based on determining that the device location does not correspond to a trusted location.

5. The system of claim 1, wherein the one or more processors, to determine the confidence score, are configured to:

determine the device location based on the location information associated with the device;

determine one or more historical locations associated with at least one of:

a transaction associated with the account, the owner of the document, or the device; and determine the confidence score based on two or more of the location, the device location, or the one or more historical locations.

6. The system of claim 1, wherein the positioning information indicated by the device includes geographic identifiers that correspond to the device location, and wherein the one or more processors, to determine the confidence score, are configured to:

determine the device location based on the geographic identifiers; and determine the confidence score based on the location and the device location.

7. The system of claim 1, wherein the information indicated via the metadata associated with the document image includes geographic location information that corresponds to the device location at a time that the document image is captured, and wherein the one or more processors, to determine the confidence score, are configured to:

determine the device location based on the geographic location information; and determine the confidence score based on the location and the device location.

8. The system of claim 1, wherein the information indicated via the metadata associated with the document image includes at least one of:

geographic location information of the device that corresponds to a time at which the document image is captured, or time stamp information that corresponds to the time that the document image is captured.

9. The system of claim 1, wherein the positioning information indicated by the device includes at least one of:

geographic identifiers associated with the device location, or an identifier associated with the device.

10. A method for location-based authentication using a document and a device location of a user device, comprising:

obtaining, by a device, a document image, the document depicting location information associated with an owner of the document;

obtaining, by the device, location information associated with the user device;

processing, by the device, the document image to obtain a location based on the location information associated with the owner of the document, wherein processing the document image includes at least one of:

performing, by the device, optical character recognition using the document image to obtain the location, or scanning, by the device, a machine-readable code depicted in the document image to obtain the location;

determining, by the device, the device location based on the location information associated with the user device;

determining, by the device, a confidence score based on a correlation between the location and the device location;

determining, by the device, whether the confidence score satisfies a threshold; and performing, by the device, an action based on determining whether the confidence score satisfies the threshold.

11. The method of claim 10, wherein obtaining the document image is associated with an access attempt to an account, and wherein performing the action comprises:

authenticating the access attempt to the account based on determining that the confidence score satisfies the threshold.

12. The method of claim 10, wherein obtaining the document image is associated with an access attempt to an account, wherein the threshold includes a first threshold and a second threshold, and wherein performing the action comprises:

requesting additional information associated with the access attempt to the account based on determining that the confidence score does not satisfy the first threshold and does satisfy the second threshold.

13. The method of claim 10, wherein obtaining the document image is associated with an access attempt to an account, and wherein performing the action comprises:

refraining from authenticating the access attempt to the account based on determining that the confidence score does not satisfy the threshold.

14. The method of claim 10, wherein determining the device location comprises:

obtaining a live user image from the user device, the live user image being a live image of the user;

identifying a geographical location identifier associated with the live user image; and determining the device location based on identifying the geographical location identifier.

15. The method of claim 10, further comprising:

obtaining a live user image from the user device, the live user image being a live image of the user;

identifying a location parameter associated with the live user image;

determining whether the location parameter corresponds to the device location; and updating the confidence score based on determining that the location parameter does not correspond to the device location.

16. The method of claim 10, wherein the user device is a trusted device, and wherein determining the device location comprises:
- identifying a network identifier associated with the trusted device; and
- determining the device location based on the network identifier.

17. A non-transitory computer-readable medium storing a set of instructions, the set of instructions comprising:
- one or more instructions that, when executed by one or more processors of a device, cause the device to:
  - detect an authentication event associated with an access attempt for an account, the account being associated with a trusted user;
  - obtain, from a user device, a document image associated with a document based on detecting the authentication event, the document being an identification document issued by a trusted entity;
  - extract information from the document image, the information including location information associated with an owner of the document;
  - extract location information associated with the user device, the location information including at least one of:
    - information indicated via metadata associated with the document image, or
    - positioning information indicated by the user device; and
  - determine a confidence score based on the location information associated with the owner of the document, the location information associated with the user device, and one or more estimated device location regions,
    - wherein the confidence score indicates a likelihood that the user device is associated with the owner of the document; and
  - authenticate the access attempt based on the confidence score satisfying a threshold.

18. The non-transitory computer-readable medium of claim 17, wherein the one or more instructions, that cause the device to authenticate the access attempt, are configured to:
- obtain, from a document authentication model, a document score indicating a likelihood that the document is authentic and is associated with the trusted user of the account;
- provide, to an authentication model, the document score and the confidence score; and
- authenticate the access attempt based on an output of the authentication model indicating that the access attempt is authentic.

19. The non-transitory computer-readable medium of claim 17, wherein the one or more instructions, when executed by the one or more processors, further cause the device to:
- store a device location indicated by the location information based on the confidence score satisfying the threshold; and
- authenticate one or more future access attempts for the account using the device location.

20. The non-transitory computer-readable medium of claim 17, wherein the one or more instructions, that cause the device to determine the confidence score based on the location information associated with the owner of the document, the location information associated with the user device, and the one or more estimated device location regions, cause the device to:
- obtain, from an authentication model, the one or more estimated device location regions and respective confidence scores based on a device location indicated by the location information; and
- determine the confidence score based on the location information associated with the owner of the document, the location information associated with the user device, and the estimated device location regions and the respective confidence scores.

* * * * *